(12) United States Patent
Ashikhmin et al.

(10) Patent No.: US 8,300,726 B2
(45) Date of Patent: Oct. 30, 2012

(54) INTERPOLATION METHOD AND APPARATUS FOR INCREASING EFFICIENCY OF CROSSTALK ESTIMATION

(75) Inventors: Alexei Ashikhmin, Morristown, NJ (US); Adriaan J. De Lind Van Wijngaarden, New Providence, NJ (US); Gerhard Guenter Theodor Kramer, Chatham, NJ (US); Philip Alfred Whiting, New Providence, NJ (US); Miroslav Zivkovic, 's-Gravenhage (NL)

(73) Assignee: Alcatel Lucent, Paris (FR)

( * ) Notice: Subject to any disclaimer, the term of this patent is extended or adjusted under 35 U.S.C. 154(b) by 885 days.

(21) Appl. No.: 11/934,347

(22) Filed: Nov. 2, 2007

(65) Prior Publication Data

US 2009/0116582 A1 May 7, 2009

(51) Int. Cl.
*H04K 1/02* (2006.01)

(52) U.S. Cl. ..... 375/296; 375/346; 375/348; 455/562.1; 370/203; 370/208; 370/343

(58) Field of Classification Search .......... 375/296
See application file for complete search history.

(56) References Cited

U.S. PATENT DOCUMENTS

| | | | | | |
|---|---|---|---|---|---|
| 5,235,534 | A | * | 8/1993 | Potter | 708/300 |
| 5,513,120 | A | * | 4/1996 | Berlad | 708/290 |
| 5,867,478 | A | * | 2/1999 | Baum et al. | 370/203 |
| 6,243,587 | B1 | * | 6/2001 | Dent et al. | 455/456.2 |
| 6,532,258 | B1 | | 3/2003 | Goldston et al. | |
| 6,999,507 | B2 | * | 2/2006 | Jin | 375/224 |
| 7,373,130 | B2 | * | 5/2008 | Huss | 455/296 |
| 2005/0129144 | A1 | * | 6/2005 | Betts et al. | 375/316 |
| 2006/0205437 | A1 | * | 9/2006 | Sung et al. | 455/562.1 |
| 2007/0064839 | A1 | * | 3/2007 | Luu | 375/340 |

FOREIGN PATENT DOCUMENTS

WO 2006/131791 12/2006
WO PCT/US2008/012281 1/2009

OTHER PUBLICATIONS

R. Cendrillon, "Multi-User Signal and Spectra Coordination for Digital Subscribers Lines," Ph.D. thesis, Department of Electrical Engineering, Dec. 2004, 200 pages, Belgium.

(Continued)

*Primary Examiner* — Lihong Yu
(74) *Attorney, Agent, or Firm* — Ryan, Mason & Lewis, LLP

(57) ABSTRACT

Techniques are disclosed that efficiently obtain channel crosstalk estimates in DSL systems and other communication systems that may include unsynchronized channels. For example, a method includes obtaining a first set of estimated measures of crosstalk for a first portion of a plurality of communication channels over which data signals are to be transmitted from a transmitter to a plurality of receivers, and interpolating a second set of estimated measures of crosstalk for a second portion of the plurality of communication channels based on the first set of estimated measures of crosstalk. The first portion of the plurality of communication channels may be a subset of the plurality of communication channels and the second portion of the plurality of communication channels is a remainder of the plurality of communication channels. Each estimated measure of crosstalk may relate to at least one tone associated with at least one of the plurality of communication channels.

20 Claims, 3 Drawing Sheets

OTHER PUBLICATIONS

P. Whiting et al., "Performance Results for Digital Subscriber Line Precoders," Alcatel-Lucent Technical Report, ITD-07-4768R, Apr. 2007, pp. 1-35.

U.S. Appl. No. 11/848,684, filed in the name of A. De Lind Van Wijngaarden et al. on Aug. 31, 2007 and entitled "Method and Apparatus for Self-Tuning Precoder."

U.S. Appl. No. 11/897,809, filed in the name of M. Guenach et al. on Aug. 31, 2007 and entitled "Determining Channel Matrices by Correlated Transmissions to Different Channels."

U.S. Appl. No. 11/897,877, filed in the name of G. Kramer et al. on Aug. 31, 2007 and entitled "Determining A Channel Matrix by Measuring Interference."

U.S. Appl. No. 60/974,262, filed in the name of A. Ashikhmin et al., on Sep. 21, 2007 and entitled "Methods for Optimizing Precoder Settings Using Average SINR Reports for Groups of Tones."

R. Cendrillon et al., "Partial Crosstalk Precompensation in Downstream VDSL," Signal Processing, Elsevier Science Publishers, Nov. 2004, pp. 2005-2019, vol. 84, No. 11.

* cited by examiner

INTERPOLATION METHOD AND APPARATUS FOR INCREASING EFFICIENCY OF CROSSTALK ESTIMATION

CROSS REFERENCE TO RELATED APPLICATIONS

The present application is related to the U.S. patent applications respectively identified by Ser. Nos. 11/848,684 (entitled "Method and Apparatus for Self-Tuning Precoder"), Ser. No. 11/897,877 (entitled "Determining a Channel Matrix by Measuring Interference") and Ser. No. 11/897,809 (entitled "Determining Channel Matrices by Correlated Transmissions to Different Channels"), all filed on Aug. 31, 2007, the disclosures of which are incorporated by reference herein. The present application is also related to the U.S. provisional patent application identified by Ser. No. 60/974,262 (entitled "Methods for Optimizing Precoder Settings Using Average SINR Reports for Groups of Tones"), filed on Sep. 21, 2007, the disclosure of which is incorporated by reference herein.

FIELD OF THE INVENTION

The present invention relates generally to communication systems, and more particularly to techniques for interpolating crosstalk estimates associated with communication channels in such systems.

BACKGROUND OF THE INVENTION

As is well known, a communication system may utilize multiple communication channels to communicate signals between transmitters and receivers of the system. For example, multiple channels may be used to separate different transmitted data signals from one another.

A problem that can arise in multiple channel communication systems relates to crosstalk between the various channels, also referred to as inter-channel crosstalk. For example, in a typical digital subscriber line (DSL) system, each of the channels may comprise orthogonal frequency division multiplexed (OFDM) tones or discrete multitone (DMT) modulation tones transmitted over a physical communication link such as twisted-pair copper wire. A transmission on one subscriber line may cause interference on other subscriber lines which can result in performance degradation of the system. More generally, a given "victim" channel may experience crosstalk from multiple "disturber" channels, again leading to undesirable interference. Of course, it is to be understood that interference can be mutual, i.e., a victim channel can be a disturber channel, and a disturber channel can be a victim channel.

A DSL precoder is a matrix digital filter which acts on signals to be transmitted simultaneously so as to reduce or eliminate the crosstalk interference between them. To perform this function ideally, the precoder must employ the exact values of the relative crosstalk coefficients between the given lines.

However, it is difficult to provide accurate crosstalk estimates rapidly, both because of the precision required and because these coefficients change over time as a result of temperature changes and other external factors. Since there may be several hundred tones to be measured both downstream and upstream, the process of obtaining these estimates can be numerically quite intensive.

A need exists for techniques that efficiently obtain channel crosstalk estimates in DSL systems and other forms of interference such as alien crosstalk from co-located lines with DMT signals unsynchronized to the victim line.

SUMMARY OF THE INVENTION

Principles of the invention provide techniques that efficiently obtain channel crosstalk estimates in DSL systems and other communication systems that may include unsynchronized channels.

For example, in one aspect of the invention, a method includes obtaining a first set of estimated measures of crosstalk for a first portion of a plurality of communication channels over which data signals are to be transmitted from a transmitter to a plurality of receivers, and interpolating a second set of estimated measures of crosstalk for a second portion of the plurality of communication channels based on the first set of estimated measures of crosstalk.

The first portion of the plurality of communication channels may be a subset of the plurality of communication channels and the second portion of the plurality of communication channels may be a remainder of the plurality of communication channels.

The method may further include adjusting a set of data signals based on at least a portion of the first set and the second set of estimated measures of crosstalk. The first set of estimated measures of crosstalk may be generated from signal-interference-plus-noise ratio (SINR) measurements received from at least a portion of the plurality of receivers.

In a first embodiment, the interpolating step may further include generating interpolated phase and amplitude values that comprise the second set of estimated measures of crosstalk. These interpolated phase and amplitude values may be generated from measured phase and amplitude values that comprise the first set of estimated measures of crosstalk. The interpolated phase values may be generated by a curve fitting operation. The interpolated amplitude values may be generated by selecting a nearest measured amplitude value.

In a second embodiment, the interpolating step may further include providing a finite response filter, computing a convolution of values of the first set of estimated measures of crosstalk using the finite response filter, and obtaining values for the second set of estimated measures of crosstalk based on the computed convolution.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be illustrated below in conjunction with exemplary communication systems and associated techniques for compensating for crosstalk between communication channels in such systems. It should be understood, however, that the invention is not limited to use with any particular type of communication system or channel crosstalk measurement application. The disclosed techniques are suitable for use with a wide variety of other communication systems, and in numerous alternative crosstalk measurement applications. For example, although illustrated below in the context of DSL systems based on DMT, the disclosed techniques can be adapted in a straightforward manner to other types of wired or wireless communication systems, including cellular systems, multiple-input multiple-output (MIMO) systems, Wi-Fi or WiMax systems, etc.

As used herein, a "channel" is to be understood to be the physical medium through which communication signals are sent between a transmitter and a receiver. In many cases there may be several such channels in close proximity to one another and this may cause interference or crosstalk, as mentioned above. A "line" or wireline is an example of a channel which is constructed by use of a cable, such as a copper wire, or any other equivalent means of directing a signal between users. In DSL, it is the bundling of lines together which leads to crosstalk. Furthermore, one form of signaling both in wireline and wireless access is to divide the spectrum of the channel into narrow frequency bands known as "tones." For example, in a wireless channel, symbols in OFDM are sent via their respective tones. A similar division is often made in DSL.

Figure 1:
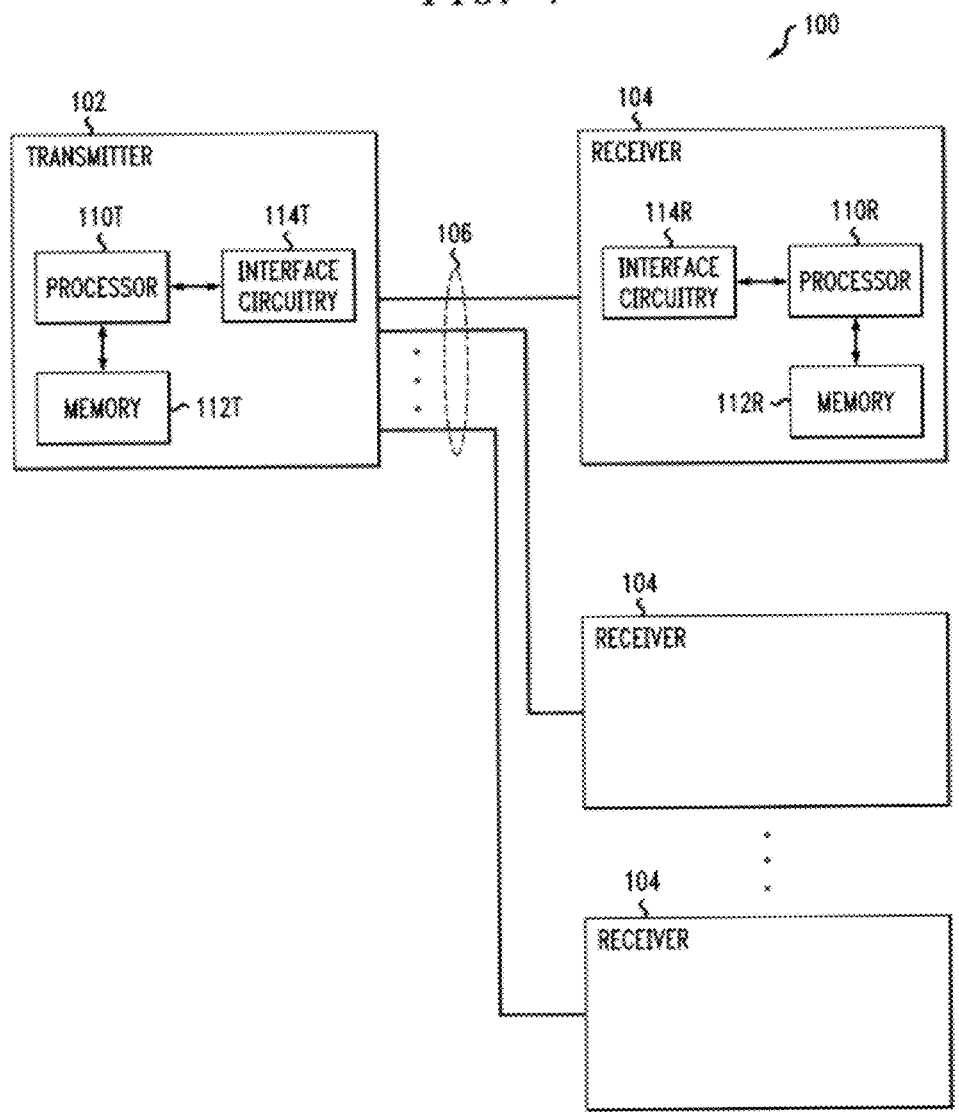
FIG. 1 illustrates a communication system according to an illustrative embodiment of the invention.

FIG. 1 shows a communication system 100 comprising a transmitter 102 that communicates with multiple receivers 104 over respective communication channels 106. The communication channels 106 may comprise wired channels or wireless channels. As shown in FIG. 1, the transmitter 102 comprises a processor 110T coupled to a memory 112T and interface circuitry 114T. Similarly, a given one of the receivers 104 comprises a processor 110R coupled to a memory 112R and interface circuitry 114R. The other receivers 104 are assumed to be configured in a similar manner.

Although a single transmitter is shown communicating with multiple receivers in the illustrative system 100, numerous other configurations are possible. For example, multiple transmitters may communicate with multiple receivers, or a single transmitter may communicate with a single receiver. The terms "transmitter" and "receiver" as used herein are intended to be construed generally, so as to encompass single respective transmitter and receiver elements as well as combinations of multiple respective transmitter and receiver elements. Also, the transmitter 102 may comprise multiple separate transmitting units, for example, in the case of a central office in a DSL system, or a base station in a cellular system.

Moreover, a given communication device of the type shown in the figure may function as both a receiver and a transmitter. Thus, elements 102 and 104 of system 100, although characterized as respective transmitter and receiver elements for purposes of illustration, may each comprise transceiver circuitry and be operative to function as both a transmitter and a receiver. The crosstalk interpolation techniques disclosed herein may therefore be employed with respect to transmissions from an element 104 to the element 102. Elements 102 and 104 may comprise or be incorporated into respective processing devices of a communication system, such as modems, computers or other communication devices. Numerous such devices are well known to those skilled in the art and are therefore not further described herein.

Software programs for estimation, interpolation and compensation of crosstalk and performance of associated transmitter and receiver signal processing operations in the system 100 may be stored in memory 112 and executed by processor 110. The transmitter 102 and receivers 104 may each comprise multiple integrated circuits, digital signal processors or other types of processing devices, and associated supporting circuitry, in any combination, using well-known conventional arrangements. Of course, numerous alternative arrangements of hardware, software or firmware in any combination may be utilized in implementing the transmitter 102 and receivers 104 or particular portions thereof.

The system 100 as shown in the figure may be viewed as being representative of any of a number of different types of communication systems. By way of example, the system 100 may comprise a DSL system in which data is transmitted using DMT tones. Conventional aspects of such systems are well known and therefore not described in detail herein. Inter-channel crosstalk in a DSL system using DMT may comprise, for example, far-end crosstalk (FEXT), although the disclosed techniques are more generally applicable to a wide variety of other types of crosstalk. Because the DMT tones are typically relatively narrow with respect to the total frequency spectrum used, the impact at a particular frequency may be modeled as a single complex coefficient h denoting the crosstalk into a given "victim" subscriber line from a given "disturber" subscriber line at a given tone index. The amplitude of the coefficient represents the change in scale for the corresponding DMT carrier whereas the phase of the coefficient represents the change in phase for that carrier.

The crosstalk between the multiple communication channels 106 over which transmitter 102 communicates with receivers 104 in the system 100 may be compensated using an approach referred to as precoding, also known as precompensation. In one precompensation approach, crosstalk measures determined by the receivers and communicated to the transmitter are used to determine coefficients of a channel matrix. Effective precoding generally requires accurate channel gain and phase information. For example, using a linear crosstalk model to characterize N channels, an N×N channel matrix may be generated, with the off-diagonal elements of the matrix representing the above-noted complex coefficients characterizing the inter-channel crosstalk. The precoding may be applied in the transmitter using a linear zero-forcing digital filter (or precoder) that receives as its inputs a vector of data signals to be transmitted and the above-noted channel matrix and generates therefrom a vector of compensated data signals.

Another application in which measures of inter-channel crosstalk may be used is in managing the various channels of the system. For example, such measures may be used to determine an optimum allocation of power or other resources among the channels or to provide stability of channel bit rates. In the DSL context, this may involve utilizing the measures to improve dynamic spectrum management (DSM) level 2 power assignments or stability algorithms, thereby facilitating the maintenance of a declared bit rate for a given line. These and other resource allocation applications typically require less accurate estimates, and hence may not need channel phase information.

The transmitter 102 and receivers 104 of system 100 in FIG. 1 are advantageously configured such that estimates or other measures of inter-channel crosstalk may be generated in an accurate and efficient manner. Such crosstalk measures may be returned from the receivers 104 to the transmitter 102 for use in applications such as precoding or resource allocation of the type described above. The measures may comprise, for example, impulse response coefficients characterizing the crosstalk. Alternatively, measures generated by the receivers may be returned to the transmitter and further processed there to obtain impulse response coefficients.

In accordance with illustrative embodiments, techniques for obtaining crosstalk estimates will now be described. By way of example, such crosstalk estimation techniques can be implemented in transmitter 102 of the communication system of FIG. 1.

Principles of the invention realize that it is advantageous to obtain crosstalk estimates on all tones by measuring only a small fraction of the tones and interpolating the crosstalk estimates on the remainder of the tones. Advantageously, this can reduce the time needed to obtain the estimates by a significant factor. Moreover, one may be prepared to use stronger measurement signals on a small number of tones or even conduct measurements so as to disrupt the signals on the tone completely. Additionally, even if the interpolated values are not sufficiently precise they may be passed on to devices such as a self-tuning precoder which can quickly refine the estimates. An example of such a self-tuning precoder is described in the above-referenced Ser. No. 11/848,684 (entitled "Method and Apparatus for Self-Tuning Precoder"). Finally, such a device can be used to determine the accuracy or efficacy of the crosstalk coefficient estimate supplied by interpolation.

Even when accurate crosstalk estimates are available and are being used, interpolation methods can enhance the ability to track changes in the crosstalk coefficients. For example, in many cases, measured lines have phase which depends linearly on frequency to a close approximation. If this is the case, phase estimates on several tones can be used to accurately infer the phase on a given tone so that the estimation effort needed to acquire the phase or its equivalent can be substantially reduced. However, it may be preferable to have more than two points in order to account for phase ambiguity (i.e., modulo $2\pi$) as well as small variations. By way of further example, interpolation can be used to recover the crosstalk estimates of tones where tracking has been lost and precoding performance has been degraded.

Principles of the invention may interpolate over time as well as over frequency. Thus, if at one time we know certain or all of the crosstalk coefficients with a sufficient level of accuracy then, after some time, the crosstalk coefficients will be different to some degree. Further, on physical grounds we may suppose that there is a certain regularity or model as to how changes take place as a function of changes in temperature, humidity and so on.

Given the above, we may then estimate the crosstalk coefficients on the majority of tones for which we had precoder measurements in the first place, by first accurately determining the crosstalk coefficients on a small subset of the tones and then inferring the rest by estimating the change in the physical factors and then determining the changes in the remainder as a result.

The interpolation techniques of the invention can also be used in conjunction with DSM level 2 algorithms, which seek to determine the power spectrum on the basis of the crosstalk amplitudes. In DSM level 2, the interference between users is controlled by power assignment across tones, thus controlling the degree of crosstalk. Usually only knowledge of the crosstalk amplitudes are needed in order to determine the user transmit spectrum. Interpolation enhances this method of mitigating crosstalk by allowing the system to determine the crosstalk amplitudes between a pair of lines with minimal use of actual measurement. The interpolator provides the estimates for the missing crosstalk amplitudes together with an error estimate and these two may then be used to determine the power spectrum assignment. Thus, systems constraints can be circumvented. Additionally, far less computational complexity is required.

To summarize, the interpolation methods of the invention have at least two important features. First, they have the capability to estimate or anticipate the values of crosstalk at intermediate unmeasured tones given estimates at a subset of tones. Second, they provide an error estimate for the interpolated values. These error estimates may be used to decide whether measurement on additional tones is needed. They can also be passed on to devices such as the self-tuning precoder, along with the interpolated values, so that these devices can in turn decide which lines to address in reducing crosstalk. This is done at the end of the interpolation stage of estimation.

Figure 2:
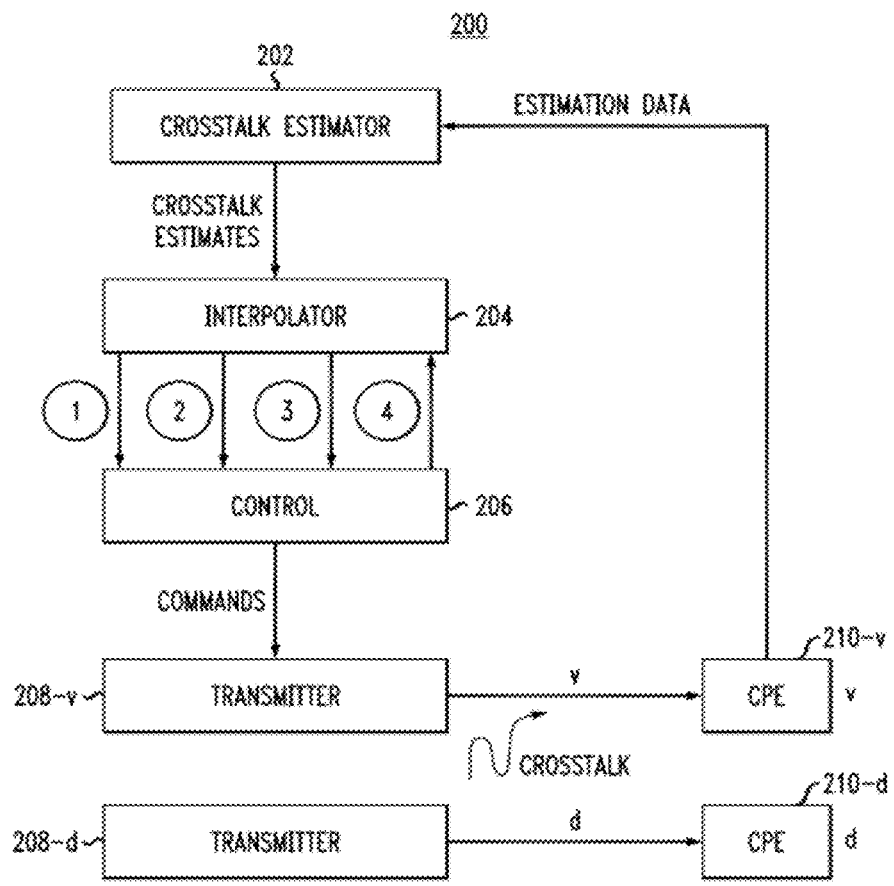
FIG. 2 illustrates an interpolation architecture used to estimate crosstalk according to an illustrative embodiment of the invention.

FIG. 2 illustrates an interpolation architecture according to an embodiment of the invention. As shown, architecture 200 includes crosstalk estimator 202, interpolator 204, adjustment control 206, transmitter 208-*v* ("v" denoting the transmitter associated with the victim communication channel or line), transmitter 208-*d* ("d" denoting the transmitter associated with the disturber communication channel or line), customer premises equipment (CPE) 210-*v* ("v" denoting the CPE associated with the victim communication channel or line) and customer premises equipment (CPE) 210-*d* ("d" denoting the CPE associated with the victim communication channel or line). Each CPE may comprise a modem, a computer or other communication device. It is to be understood that while crosstalk estimator 202, interpolator 204 and adjustment control 206 are shown in the figure as being separate from transmitter 208-*v*, these functional components are preferably part of the transmitter system. In fact, the transmitter system may be considered as including crosstalk estimator 202, interpolator 204, adjustment control 206, transmitter 208-*v* and transmitter 208-*d*. Thus, functional components are shown separately in the figure for ease of reference. Further, by way of example, it is to be appreciated that crosstalk estimator 202, interpolator 204, adjustment control 206 and transmitter 208-*v* can be implemented in transmitter 102 of the communication system of FIG. 1. The CPEs would correspond to the receivers (104) shown in FIG. 1. However, principles of the invention are not limited to this particular architecture, i.e., alternatively, one or more of the crosstalk estimator, interpolator and adjustment control may actually be implemented separate from the transmitter.

In general, transmitters 208 simultaneously transmit data signals to CPEs 210 via respective communication lines. In the illustrative scenario shown in FIG. 2, crosstalk from one of a plurality of lines (disturber line d) is present on another one of the plurality of lines (victim line v). However, while only one disturber line is shown, in practice, more than one line may cause crosstalk to be present on the victim line. Crosstalk estimation data is fed back from CPE 210-*v* to crosstalk estimator 202. In a crosstalk compensation-enabled transmission system that does not employ interpolation according to the invention, crosstalk estimates for every line (tone) that causes crosstalk on the victim line are measured. These estimates are then used to adjust the subsequent data signals to be transmitted by the transmitters of the system. The process may then iterate by obtaining new estimates and making new adjustments. In theory, if the estimates are precise, adjustment of the data signals will eliminate the crosstalk present on the victim line. However, it is to be appreciated that the better the estimates, the better the reduction of crosstalk.

One exemplary embodiment of a mechanism for compensating for crosstalk that can be used in architecture 200 of FIG. 2 is described in the above-referenced Ser. No. 11/848,684 (entitled "Method and Apparatus for Self-Tuning Precoder"). Therein, a self-tuning precoder architecture is described that uses perturbation based estimates to cancel crosstalk on a victim line from disturber lines. As explained therein, a current state of a matrix in the precoder (i.e., a precoder matrix) is determined by a matrix of relative crosstalk estimates which is used to derive a matrix filter. Signal-to-interference-plus-noise ratio (SINR) estimates are provided by the victim CPE before perturbation and after a perturbation made for a particular disturbing line. This feedback is provided to a precoder which also issues commands for the perturbations in the precoder matrix. Such commands are made taking into account not only the impact on the line of interest v but also the impact on other lines. Additionally commands can be sent to the precoder to change to a new precoder operating point (update precoding matrix) according to error estimates. The self-tuning precoder is at the transmitter which, in some cases, may be at the customer's central office (CO) and, in other cases, at a remote terminal node. It is to be understood that, for the sake of clarity, precoders are not expressly shown in FIG. 2, but can be assumed to be in transmitters 208. Also, other techniques (i.e., other than updating of a precoder matrix) may be employed in a transmitter to compensate for the crosstalk based on obtained crosstalk estimates.

However, as mentioned above and regardless of the compensation technique used to reduce or eliminate the crosstalk, computing crosstalk estimates for all tones (lines) can be quite burdensome. Advantageously, principles of the invention provide for obtaining crosstalk estimates on all tones by measuring only a small fraction of the tones and interpolating the crosstalk estimates on the remainder of the tones. This is accomplished via interpolator 204.

Interpolator 204 takes, as input, point estimates for the crosstalk amplitude and phase together with error estimates for a given subset of the tones. Most of these tones will be uniformly spaced, however, measurements at additional tones may be provided. One reason to do this is because interpolation over parts of the band may not be very effective. A second reason is to provide an additional source of accurate estimates which can be used to assess interpolation accuracy.

As generally shown in FIG. 2, a subset of crosstalk estimates are computed by crosstalk estimator 202. This subset of estimates is provided to interpolator 204. Interpolator 204 generates interpolated estimates from the subset of estimates it receives, as will be explained in detail below (in the context of embodiments in FIGS. 3 and 4). The interpolated crosstalk estimates are then tested. Then, the full set of estimates (e.g., subset of estimates received from estimator 202 and the remaining estimates interpolated by interpolator 204) is used by adjustment control 206 to tune the precoder (e.g., update the precoder matrix) associated with the transmitters. Since principles of the present invention focus on generation of interpolated crosstalk estimates, a detailed discussion of how the subset of actual estimates are measured or how the full set is used to adjust the data signals is not presented herein. Such details may be found, by way of example only, in the above-referenced U.S. patent applications respectively identified by Ser. Nos. 11/848,684 (entitled "Method and Apparatus for Self-Tuning Precoder"), Ser. No. 11/897,877 (entitled "Determining a Channel Matrix by Measuring Interference") and Ser. No. 11/897,809 (entitled "Determining Channel Matrices by Correlated Transmissions to Different Channels").

Also, as shown in FIG. 2, control block 206 can provide feedback control to interpolator 204. For example, control block 206 could direct interpolator 204 which interpolation technique to use. Also, control block 206 may perform testing on the interpolated crosstalk estimates whereby a measure of quality (e.g., error estimate described below) is determined and used to decide whether or not further interpolation should be performed. It is to be understood that only certain lines of communication between the various entities are depicted in FIG. 2 and, thus, additional or alternate lines of communication may exist without altering the nature of the invention.

Herein below we describe two illustrative embodiments for interpolating crosstalk estimates that may be employed by interpolator 204.

In a first embodiment, we use an interpolation approach which can be performed on the phase and amplitude separately. With respect to phase, we may for example interpolate by using a straight line in some cases and, in other cases, by fitting a linear piecewise curve or some other suitable approximation using only a small number of parameters. In the case of crosstalk amplitude, we interpolate the value to be the nearest one measured. Both of these techniques have given usable results for interpolation.

After interpolation has been performed, it is determined whether the interpolated values are accurate enough for tuning to be initiated. This may be done by examining the error or by the use of precoding to see if the estimates lead to a rise in SINR. If estimates are found to be inadequate, the interpolator makes requests for additional tones to be measured.

Figure 3:
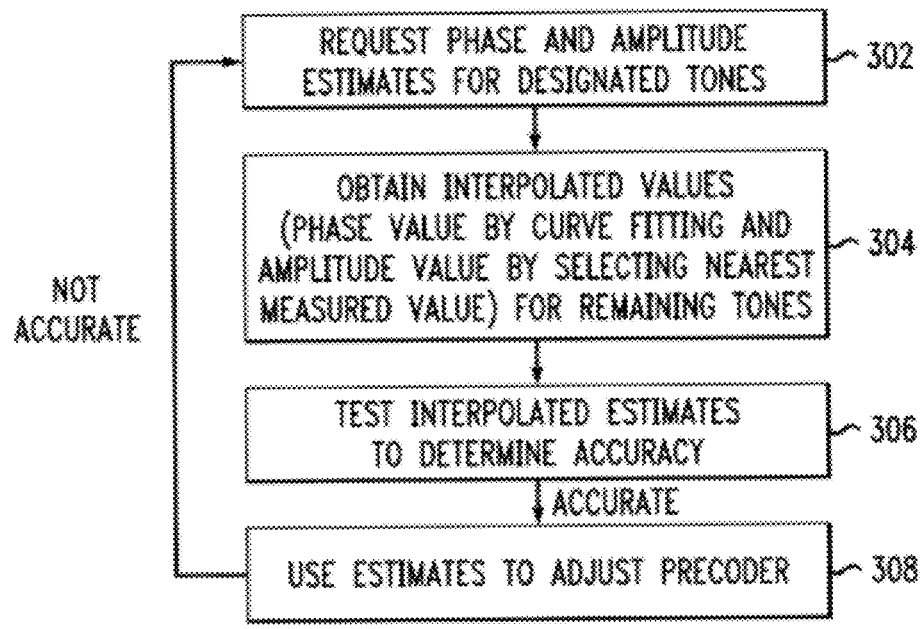
FIG. 3 illustrates a crosstalk estimate interpolation method according to an illustrative embodiment of the invention.

FIG. 3 illustrates method 300 which interpolator 204 employs in constructing crosstalk estimates for the entire downstream band. As shown:

Step 302: Request phase and amplitude estimates for designated tones.

Step 304: Obtain interpolated values for remaining tones.

Step 306: If estimates sufficiently accurate go to step 308, else to step 302.

Step 308: Use estimates to adjust precoder.

A similar set of steps is taken if the coefficients are being used for level 2 spectrum management.

In a second illustrative embodiment, we use an approach that includes convolving the vector of measured crosstalk coefficients with a smooth filter. More particularly, we provide a filtering method for estimating unknown crosstalk values.

Let $h=(h_1, \ldots, h_L)$ be a vector of crosstalk coefficients in the frequency domain between line v (victim) and line d (disturber). We assume that the coefficient $h_l$ corresponds to the frequency $f=f_0+l\cdot\Delta$, where $f_0$ and $\Delta$ are constant. Let us assume that we are allowed to measure only L/r coefficients of h. The parameter "L" refers to the number of frequencies, and "r" refers to the fraction of measured coefficients, e.g., if r=10, we know one in ten coefficients. Our task is to reconstruct (interpolate) the missing coefficients of h.

According to numerous measurements results, conducted for cables of different types and lengths, it is difficult to reconstruct the first coefficients of h. For this reason, the first m coefficients $h_1, h_2, \ldots, h_m$ of h are measured accurately by some appropriate, e.g., SINR feedback as disclosed in the above-referenced U.S. patent applications respectively identified by Ser. Nos. 11/848,684 (entitled "Method and Apparatus for Self-Tuning Precoder"), Ser. No. 11/897,877 (entitled "Determining a Channel Matrix by Measuring Interference") and Ser. No. 11/897,809 (entitled "Determining Channel Matrices by Correlated Transmissions to Different Channels"). Simulation results indicate that acceptable interpolation results can be obtained for values of m that are in the range from 20 to 30. Starting from $h_m$ onwards, we assume that every r-th coefficient of h, that is only the coefficients of the subsampled vector $\tilde{h}=(h_m, h_{m+r}, h_{m+2r}, \ldots, h_{m+nr}$ where $\lfloor (L-m)/r \rfloor$, have been measured. All other coefficients will be interpolated based on h.

Figure 4:
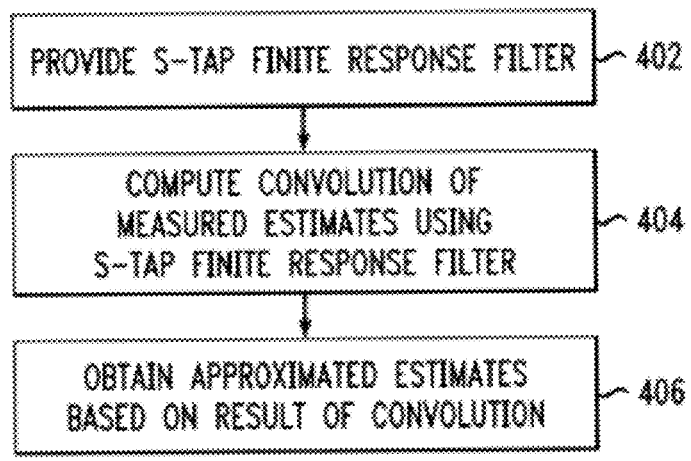
FIG. 4 illustrates a crosstalk estimate interpolation method according to another illustrative embodiment of the invention.

We suggest the following method to reconstruct vector h given $\tilde{h}$. Such method 400 is illustrated in FIG. 4. First, we design an s-tap finite response filter $b=(b_0, b_1, \ldots, b_s)$ with transition region $[1-1/r, 1]$, where the normalized frequency is used for the transition region. This corresponds to step 402. Next, we compute the convolution of $\tilde{h}$ with b, denoted by $z=\tilde{h}*b$. This corresponds to step 404. Finally, we form the vector:

$$\hat{h}=h_1, \ldots, h_m, z_1, \ldots, z_{r-1}, h_{m+r}, z_r, \ldots, z_{2r-2}, h_{m+2r}, \ldots),$$

which we use as an approximation of h. This corresponds to step 406.

It should be noted that the quality of the interpolation can typically be improved by increasing the number of taps s, but this also increases the computational complexity of the interpolation procedure. As with the method of FIG. 3, the interpolated estimates obtained in accordance with the method of FIG. 4 can then be tested and used with the measured estimates to adjust the data signals to reduce or eliminate crosstalk effects.

We now show how to assess the accuracy of the reconstructed vector $\hat{h}$. Let $\hat{H}$ be obtained from $\hat{h}$ with the help of a discrete Fourier transform (DFT) of sufficiently large size (in our experiments we used the DFT of size $2^{15}$). The vector $|\hat{H}|$ typically has one or several large peaks located in the filter transition region $[1-1/r, 1]$ and its other values $|H_j|$ typically have small values compared to the values of the peaks. Let us denote by S the indices of the components $|H_i|$ that form the peaks. Let us compute the two powers:

$$P_1 = \sum_{i \in S} |H_i|^2$$

and $$P_2 \sum_{j \in L-S} |H_j|^2.$$

In other words, $P_1$ is the total power of peaks of $|\hat{H}|$ and $P_2$ is the power of all other components of $|\hat{H}|$. If the ratio $P_1/P_2$ is large it is a strong indication that $|\hat{h}|$ is an acceptable approximation of h.

It is to be appreciated that an interpolator of the invention may also provide a degree of error as a measure of quality for each of the interpolated crosstalk estimates (as well as for the measured crosstalk estimates. This measure of quality could then be used as a means of assigning power when precoding and for DSM level-2 algorithms (e.g., also identification of unreliable regions where one may refrain from precoding until better estimates become available). There are many well known methods for assessing the degree of error which is committed when performing interpolation. For illustration only, we mention one approach. This is that a small number of additional measurements are made, when interpolating, and the results of these measurements are compared with the values predicted by the interpolation algorithm and thus the error can be estimated and inferred for other tones. A further illustrative example is made in connection with the filter method described above.

As is well known to those skilled in the art, the time needed to obtain sufficiently accurate estimates of crosstalk is an important consideration in applications such as precoding and level 2 algorithms for power spectrum assignment. The accuracy to which the crosstalk estimates are obtained is a further important consideration.

Interpolation reduces the time needed to determine crosstalk coefficients by avoiding the task of measuring every tone and reducing it to the necessity of taking only a small number of measurements. The interpolation algorithm then rapidly obtains estimates for the remainder. This process can be further enhanced by alternating the process of measurement and interpolation until sufficient accuracy is obtained.

Performance is further enhanced in interpolation by taking advantage of such physical relationships as are well known in DSL, for example, the linearity of crosstalk phase as a function of frequency. Again, if interpolation is over time, one may again exploit known forms of regularity in inferring the current crosstalk based on earlier estimates supplied via memory and/or a database.

Statistical techniques can be employed so as to obtain the most efficient estimates of error in the interpolation process. These techniques can be used both in the choice of tones to be measured (design) and in the methods by which the outcomes are analyzed (inference).

Further, to effectively use a precoder for certain DSL systems, it is preferred that the estimated phase is well within 0.1 radian of the real phase and the estimated amplitude is within 1 dB of the true crosstalk amplitude.

Still further, it is well known to those skilled in the art that crosstalk measurement is often constrained both as to which tones can be measured simultaneously and as to the time needed to perform these measurements, for example. Such constraints impair the responsiveness of algorithms by, for example, delaying the initialization of a customer's modem at start up.

Secondly, devices such as precoders may be constrained as the lines and tones which can be operated on simultaneously. These may be constraints on the number of lines, or on the set of lines themselves which can be addressed.

It is advantageous therefore to have effective a priori knowledge as to the gains which can be obtained by choosing on the one hand, one set of lines over another, or on the other hand, one set of tones over another and so on. In accordance with the invention, interpolation supplies this information by providing estimates of crosstalk rapidly across all tones, enabling optimal choices to be made at an earlier stage thereby circumventing unnecessary measurements as well as saving time. The same is true with respect to other applications which utilize crosstalk estimates and which have similar such constraints.

Advantageously, as has been described herein, principles of the invention provide an interpolation technique that increases the efficiency of crosstalk estimation. As explained, the method uses a small subset of tones for which measurements are taken. These are used to obtain additional estimates for all tones and line pairs of a DSL system. The method can be used to track changes in crosstalk coefficients when a limited number of adequate estimates are available. The method may be used as part of a strategy towards precoding which uses a relatively small number of initial measurements of crosstalk coefficients which are then used to obtain starting crosstalk coefficient estimates across the spectrum. These starting values can then be refined using a self-tuning precoder or other similar device.

It is to be appreciated that additional measurements can be made via the precoder based on the results of earlier measurements and subsequent earlier interpolations. Thus, subsequent interpolation operations may be performed based on results from one or more previous interpolation operations.

That is, principles of the invention provide a progressive iteration-based interpolation methodology.

Still further, a decision can be made as to which tones to precode against those which are neglected based only on interpolated estimates. This considers the constraints imposed by the capabilities of the precoder, e.g., the capacity to precode over no more than a maximum of 100 tones, etc.

Also, it is to be understood that principles of the invention may be applied to the task of identifying which tones should be selected for more accurate estimation and precoding, This is not precoding per se but rather determining which tones should be preceded (given our knowledge of the constraints and capabilities of the precoder as well as rough estimates themselves).

It is to be further understood that the interpolation techniques of the invention can be employed with the tone grouping techniques of the U.S. provisional patent application identified by Ser. No. 60/974,262 (entitled "Methods for Optimizing Precoder Settings Using Average SINR Reports for Groups of Tones"), filed on Sep. 21, 2007, the disclosure of which is incorporated by reference herein.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

What is claimed is:

1. A method comprising:
    obtaining a first set of estimated crosstalk coefficients measuring crosstalk caused by respective ones of a first portion of a plurality of communication channels over which signals are to be transmitted from a transmitter to a plurality of receivers; and
    interpolating a second set of estimated crosstalk coefficients measuring crosstalk caused by respective ones of a second portion of the plurality of communication channels based on the first set of estimated crosstalk coefficients measuring crosstalk caused by respective ones of the first portion of the plurality of communication channels;
    wherein an estimated crosstalk coefficient for a given one of the plurality of communication channels measures crosstalk caused by the given one of the plurality of communication channels on at least another one of the plurality of communication channels;
    wherein the second portion of the plurality of communication channels comprises at least one communication channel not in the first portion of the plurality of communication channels.

2. The method of claim 1, wherein the first portion of the plurality of communication channels is a subset of the plurality of communication channels and the second portion of the plurality of communication channels is a remainder of the plurality of communication channels.

3. The method of claim 1, wherein each estimated crosstalk coefficient relates to at least one tone associated with at least one of the plurality of communication channels.

4. The method of claim 1, further comprising the step of adjusting a set of signals based on at least a portion of the first set and the second set of estimated crosstalk coefficients.

5. The method of claim 1, wherein the first set of estimated crosstalk coefficients are generated from signal-interference-plus-noise ratio (SINR) measurements received from at least a portion of the plurality of receivers.

6. The method of claim 1, wherein the interpolating step further comprises generating interpolated phase and amplitude values that comprise the second set of estimated crosstalk coefficients from measured phase and amplitude values that comprise the first set of estimated crosstalk coefficients.

7. The method of claim 6, wherein the interpolated phase values are generated by a curve fitting operation.

8. The method of claim 6, wherein the interpolated amplitude values are generated by selecting a nearest measured amplitude value.

9. The method of claim 1, wherein the interpolating step further comprises:
    providing a finite response filter;
    computing a convolution of values of the first set of estimated crosstalk coefficients using the finite response filter; and
    obtaining values for the second set of estimated crosstalk coefficients based on the computed convolution.

10. The method of claim 1, wherein the interpolating step accounts for a change in one or more physical factors over time.

11. The method of claim 1, further comprising the step of obtaining one or more additional measurements via a precoder based on results of one or more earlier measurements and one or more subsequent earlier interpolations.

12. The method of claim 1 further comprising the step of deciding which tones to precode based on the interpolated second set of estimated crosstalk coefficients.

13. The method of claim 1, further comprising the steps of:
    determining a measure of quality associated with the interpolated second set of estimated crosstalk coefficients; and
    using the measure of quality to decide whether to obtain additional estimated crosstalk coefficients.

14. An article of manufacture comprising a non-transitory processor-readable storage medium storing one or more software programs which when executed by a processor cause performance of the steps of the method of claim 1.

15. Apparatus comprising:
    a transmitter system configured to obtain a first set of estimated crosstalk coefficients measuring crosstalk caused by respective ones of a first portion of a plurality of communication channels over which signals are to be transmitted from the transmitter system to a plurality of receivers, and to interpolate a second set of estimated crosstalk coefficients measuring crosstalk caused by respective ones of a second portion of the plurality of communication channels based on the first set of estimated crosstalk coefficients measuring crosstalk caused by respective ones of the first portion of the plurality of communication channels;
    wherein an estimated crosstalk coefficient for a given one of the plurality of communication channels measures crosstalk caused by the given one of the plurality of communication channels on at least another one of the plurality of communication channels;
    wherein at least one communication channel in the second portion of the plurality of communication channels is not in the first portion of the plurality of communication channels.

16. The apparatus of claim 15, wherein the plurality of communication channels comprise digital subscriber lines (DSL) of a DSL communication system.

17. The apparatus of claim 15, wherein the transmitter system is located at a central office of the DSL communication system.

18. The apparatus of claim 15, wherein the interpolating step further comprises generating interpolated phase and amplitude values that comprise the second set of estimated crosstalk coefficients from measured phase and amplitude values that comprise the first set of estimated crosstalk coefficients.

19. The apparatus of claim 15, wherein the interpolating step further comprises:
providing a finite response filter;
computing a convolution of values of the first set of estimated crosstalk coefficients using the finite response filter; and
obtaining values for the second set of estimated crosstalk coefficients based on the computed convolution.

20. A communication system comprising:
a plurality of receivers; and
a transmitter system configured to obtain a first set of estimated crosstalk coefficients measuring crosstalk caused by respective ones of a first portion of a plurality of communication channels over which signals are to be transmitted from the transmitter system to the plurality of receivers, and to interpolate a second set of estimated crosstalk coefficients measuring crosstalk caused by respective ones of a second portion of the plurality of communication channels based on the first set of estimated crosstalk coefficients measuring crosstalk caused by respective ones of the first portion of the plurality of communication channels;
wherein an estimated crosstalk coefficient for a given one of the plurality of communication channels measures crosstalk caused by the given one of the plurality of communication channels on at least another one of the plurality of communication channels;
wherein at least one communication channel in the second portion of the plurality of communication channels is not in the first portion of the plurality of communication channels.

* * * * *